United States Patent
Ramasamy et al.

(10) Patent No.: US 10,808,161 B2
(45) Date of Patent: *Oct. 20, 2020

(54) ECOFRIENDLY EMULSIFIER SYNTHESIS FROM ESTERIFIED WASTE VEGETABLE OIL FOR WELLBORE DRILLING FLUIDS

(71) Applicant: Saudi Arabian Oil Company, Dhahran (SA)

(72) Inventors: Jothibasu Ramasamy, Dammam (SA); Md Amanullah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,305

(22) Filed: May 24, 2019

(65) Prior Publication Data

US 2019/0276725 A1  Sep. 12, 2019

Related U.S. Application Data

(63) Continuation of application No. 16/042,723, filed on Jul. 23, 2018, now Pat. No. 10,385,254.

(60) Provisional application No. 62/537,572, filed on Jul. 27, 2017.

(51) Int. Cl.
| | | |
|---|---|---|
| C09K 8/36 | (2006.01) | |
| B01F 3/08 | (2006.01) | |
| C11C 3/04 | (2006.01) | |
| C09K 8/035 | (2006.01) | |

(52) U.S. Cl.
CPC .............. *C09K 8/36* (2013.01); *B01F 3/0811* (2013.01); *C09K 8/035* (2013.01); *C11C 3/04* (2013.01); *B01F 2003/083* (2013.01); *C09K 2208/06* (2013.01)

(58) Field of Classification Search
CPC  C09K 8/36; C09K 8/35; B01F 3/0811; C11C 3/04
USPC ......................................................... 554/161
See application file for complete search history.

(56) References Cited

U.S. PATENT DOCUMENTS

| | | | |
|---|---|---|---|
| 3,966,632 | A | 6/1976 | Colliopoulos et al. |
| 5,718,747 | A | 2/1998 | Okusawa |
| 7,008,474 | B2 | 3/2006 | Konno et al. |
| 8,563,482 | B2 | 10/2013 | Amanullah |
| 2004/0002427 | A1 | 1/2004 | Goncalves et al. |
| 2013/0210630 | A1 | 8/2013 | Musa et al. |

FOREIGN PATENT DOCUMENTS

| | | |
|---|---|---|
| CN | 1318427 | 10/2001 |
| CN | 102286273 | 12/2011 |
| RU | 2336291 | 10/2008 |
| RU | 2652378 | 11/2017 |
| WO | 2062920 | 8/2002 |
| WO | 2013078374 | 5/2013 |

OTHER PUBLICATIONS

International Search Report issued in International Application No. PCT/US2018/043675 dated Oct. 9, 2018, 12 pages.

*Primary Examiner* — Deborah D Carr
(74) *Attorney, Agent, or Firm* — Fish & Richardson P.C.

(57) ABSTRACT

Ecofriendly emulsifier synthesis from esterified waste vegetable oil for wellbore drilling fluids is described. A raw material waste vegetable oil is esterified to produce a methyl ester of the raw material waste vegetable oil. A caustic soda solution is added to the methyl ester resulting in a mixture. The mixture is thermally treated. A pH of the mixture is adjusted resulting in formation of an aqueous phase and a non-aqueous phase. The aqueous phase is separated from the non-aqueous phase.

19 Claims, 4 Drawing Sheets

ECOFRIENDLY EMULSIFIER SYNTHESIS FROM ESTERIFIED WASTE VEGETABLE OIL FOR WELLBORE DRILLING FLUIDS

CROSS-REFERENCE TO RELATED APPLICATIONS

This application claims priority to U.S. patent application Ser. No. 16/042,723, filed on Jul. 23, 2018, and entitled "ECOFRIENDLY EMULSIFIER SYNTHESIS FROM ESTERIFIED WASTE VEGETABLE OIL FOR WELLBORE DRILLING FLUIDS", which claims the benefit of priority to U.S. Provisional Patent Application Ser. No. 62/537,572, filed Jul. 27, 2017, and entitled "ECOFRIENDLY EMULSIFIER SYNTHESIS FROM ESTERIFIED WASTE VEGETABLE OIL FOR WELLBORE DRILLING FLUIDS," the contents of both which are hereby incorporated by reference.

TECHNICAL FIELD

This disclosure relates to the synthesis of an ecofriendly emulsifier for wellbore drilling systems from esterified waste vegetable oil.

BACKGROUND

Wellbore drilling operations use wellbore drilling fluids for multiple purposes including, for example, to cool the drill bit, or to transport wellbore cuttings from inside the wellbore to the surface. Drilling fluids are also used to reduce friction between the drill string and the casing, the wellbore wall, or both, by acting as a lubricating medium for the drill string while drilling the wellbore. Drilling fluids can be divided into categories, for example, oil-based drilling fluids or water-based drilling fluids. Sometimes, additives are added into either or both categories of drilling fluids to enhance the properties of the drilling fluids.

SUMMARY

This disclosure describes ecofriendly emulsifier synthesis from esterified waste vegetable oil for wellbore drilling fluids, for example, oil-based wellbore drilling fluids.

Certain aspects of the subject matter described here can be implemented as a method. A raw material waste vegetable oil is esterified to produce a methyl ester of the raw material waste vegetable oil. A caustic soda solution is added to the methyl ester resulting in a mixture. The mixture is thermally treated. A pH of the mixture is adjusted resulting in formation of an aqueous phase and a non-aqueous phase. The aqueous phase is separated from the non-aqueous phase.

This, and other aspects, can include one or more of the following features. The caustic soda solution can include an alkoxide dissolved in a solvent. The alkoxide can include sodium hydroxide. The solvent can include water. The mixture can be stirred during thermally treating the mixture. The mixture can be heated to a temperature greater than room temperature. The temperature can be substantially 60° C. Acid can be added to adjust the pH of the mixture. The acid can be substantially 31% hydrochloric acid by volume. The adjusted pH of the mixture can be substantially between 4 and 5.

Certain aspects of the subject matter described here can be implemented as a method. An ester group of a methyl ester of waste vegetable oil is cleaved to produce an emulsifier of the waste vegetable oil. A caustic soda solution is added to the methyl ester resulting in a mixture. The mixture is thermally treated at substantially 60° C. A pH of the mixture is adjusted by adding an acid. An aqueous phase and a non-aqueous phase are formed in response to adding the acid. The aqueous phase is separated from the non-aqueous phase.

The details of one or more implementations of the subject matter described in this specification are set forth in the accompanying drawings and description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Water-based drilling fluids may not be a viable drilling fluid option for certain high pressure and high temperature (HPHT) sections of a borehole. For such HPHT sections, invert emulsion oil based mud (OBM) can be used as drilling fluids. Shale formations are sensitive to water and can swell, disintegrate, and collapse upon contact with water. For this reason, OBMs are also be used as drilling fluids when drilling very reactive shale section to stabilize the shale. Certain oil-based drilling fluids, such as the invert emulsion OBM or 100% oil-based drilling fluids, include emulsifiers to create a stable emulsion of water in oil. Emulsifiers are a type of surfactants that have a hydrophilic head group and a hydrophobic tail (for example, a long chain hydrophobic tail). Emulsifiers can reduce interfacial tension between water and oil phases to achieve stability of the drilling fluid. Tall oil fatty acids (TOFA) are an example class of emulsifiers that are used in oil-based drilling fluids, for example, invert emulsion OBMs.

This disclosure describes an ecofriendly emulsifier that can be used in oil-based drilling fluids, such as invert emulsion OBMs. The ecofriendly emulsifier is prepared using vegetable oil, particularly, used or processed vegetable oil, which can be obtained, for example, from the food industry. Vegetable oil is a triglyceride extracted from a plant. A triglyceride is an ester of glycerol and three fatty acids. Depending on the source, vegetable oil contains a mixture of different types of fatty acids, for example, saturated, mono unsaturated, poly unsaturated, omega 3, omega 6 or omega 9 fatty acid. Most of the vegetable oils commonly used for cooking (for example, olive oil, palm oil, sunflower oil, corn oil, or peanut oil) contains one or more or all of these fatty acids. The presence of these different types of fatty acids makes vegetable oil a promising source for emulsifiers for drilling fluids. Vegetable oils that have been used for cooking and been disposed as waste could be used as a sustainable source for emulsifier synthesis. Unused or unprocessed vegetable oil can also be used for the emulsifier synthesis described here.

Figure 1:
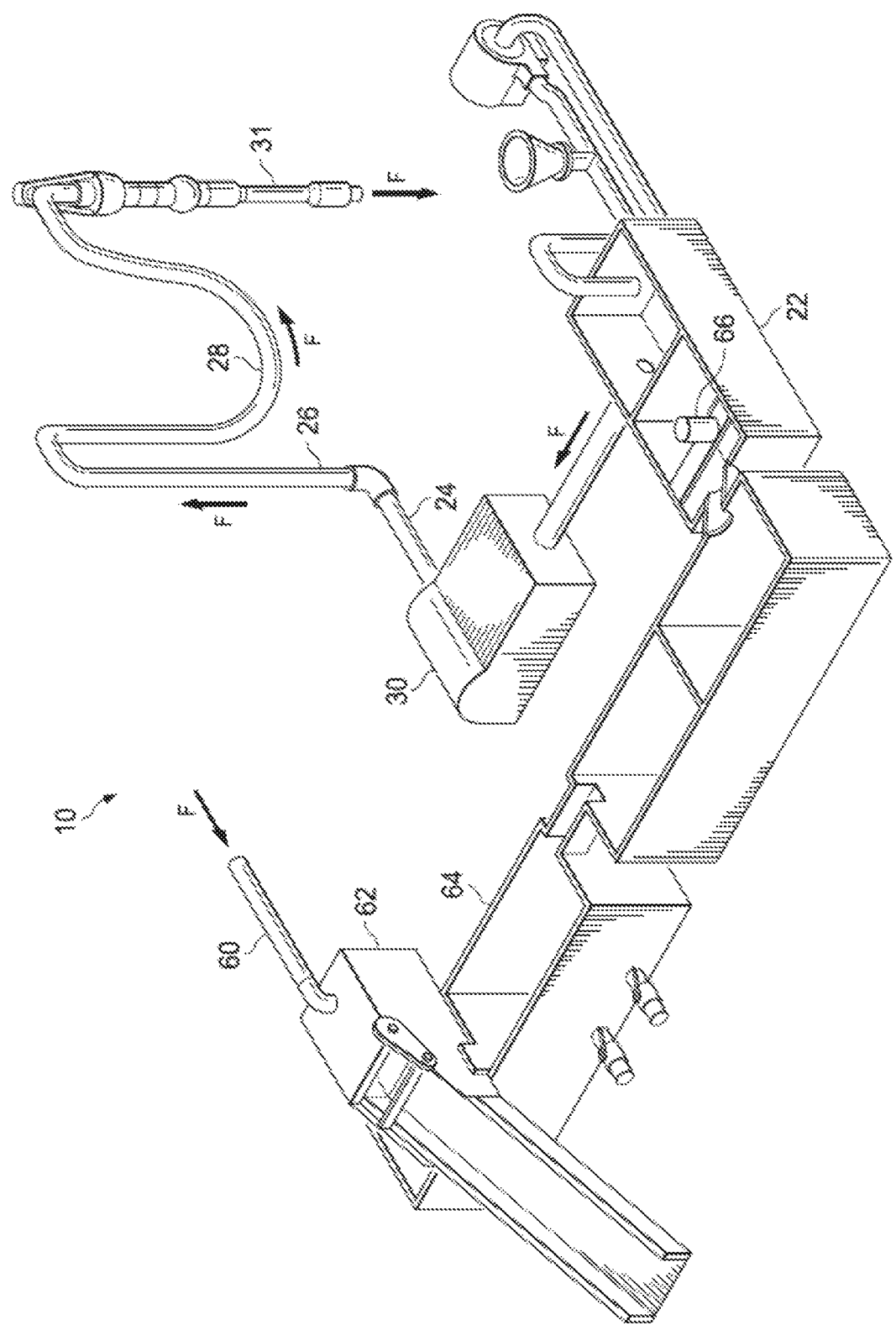
FIG. 1 is a schematic diagram of a drilling fluid circulation system.
Figure 2:
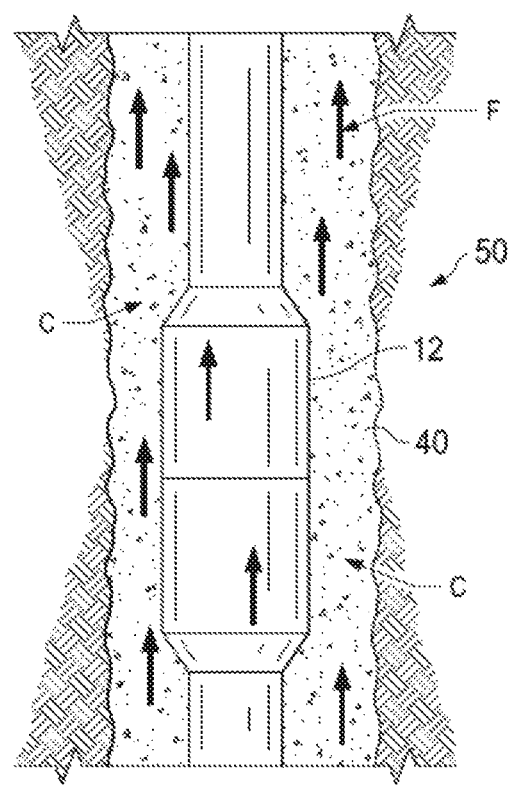
FIG. 2 is a schematic diagram showing drilling fluid flowing through a drill string and an annulus between the drill string and a wellbore.

FIG. 1 is a schematic diagram of a drilling fluid circulation system 10. FIG. 2 is a schematic diagram showing drilling fluid flowing through a drill string 12 and an annulus 40 between the drill string 12 and a wellbore 50. In wellbore drilling situations that use a drilling rig, a drilling fluid circulation system 10 circulates (or pumps) drilling fluid (for example, drilling mud) with one or more mud pumps. The drilling fluid circulation system 10 moves drilling fluid (mud, F) down into the wellbore 50 through a drill string 12, and drill collars which are connected to the drill string 12. The drilling fluid exits through ports (jets) in the drill bit, picking up cuttings C and carrying the cuttings of the wellbore 50. As seen in FIG. 1, the mud pump 30 takes suction from mud tank 22 and pumps the drilling fluid F out discharge piping 24, up with the standpipe 26, through rotary hoses 28, through Kelly or top drive unit 31, and into a central bore of the drill string 12, drill collars and drill bit as shown in FIG. 2. Drilling fluid F and cuttings C returned to the surface of the annulus 40. At the surface, the drilling fluid and cuttings leave the wellbore 50 through an outlet (not shown) and are sent to a cuttings removal system via mud return line 60 as seen in FIG. 1. At the end of the return lines, drilling fluid F and cuttings C are flowed onto a vibrating screen, for example, a shale shaker 62. Finer solids can be removed using a sand trap 64. The drilling fluid can be treated with chemicals stored in a chemical tank 66 and then provided into the mud tank 22, wherein the process can be repeated.

The drilling fluid circulation system 10 delivers large volumes of drilling fluid under pressure for the drilling rig operations. The circulation system 10 delivers the drilling fluid to the drill stem to flow down the drill string 12 and out through the drill bit appended to the lower end of the drill stem. In addition to cooling the drill bit, the drilling fluid hydraulically washes away debris, rock chips, and cuttings, which are generated as the drill bit advances into the wellbore 50. Thus, the drilling fluid is an important part of the component drilling operation which can be flowed through wellbore drilling system components, for example, as rotary, coiled tubing, or casing, in different wellbore drilling operations, for example, under balance drilling or overbalanced drilling, to perform several functional tasks and facilitate safe, trouble-free and economical drilling.

Figure 3:
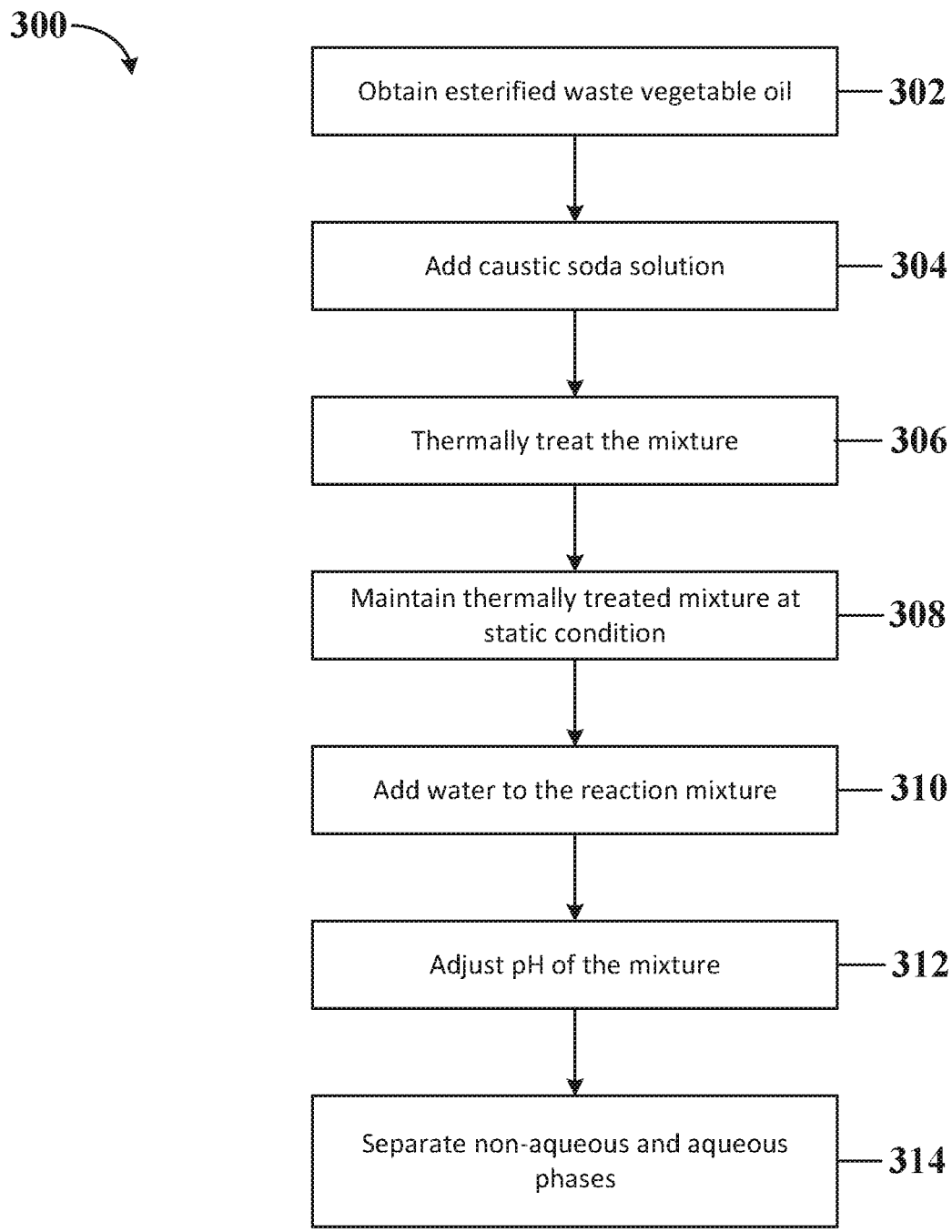
FIG. 3 is a flowchart of an example process of producing emulsifier using esterified waste vegetable oil.

FIG. 3 is a flowchart of an example process 300 of producing emulsifier using esterified waste vegetable oil. In some implementations, the emulsifier can be used in other wellbore fluids, for example, fracturing fluids, completion fluids, stimulation fluids, or a combinations of them. At 302, esterified waste vegetable oil is obtained. In some implementations, a methyl ester of waste vegetable oil is obtained. For example, waste vegetable oil (that is, vegetable oil that has been used for cooking) is esterified to prepare a methyl ester of the vegetable oil fatty acids and the derivatives thereof found in waste vegetable oil.

At 304, a caustic soda solution is added to the methyl ester of the waste vegetable oil. Adding the caustic soda solution changes the reaction mixture into a suspension. In some implementations, the caustic soda solution can be prepared by dissolving a quantity of sodium hydroxide in water. Alternatively, other alkali hydroxides can be dissolved in water to prepare the caustic soda solution. In some implementations, the caustic soda solution can be added to the methyl ester of the waste vegetable oil over a period of time. The caustic soda solution can be added at an optimal rate. For example, adding caustic soda solution at a rate of one milliliter per minute can be an optimal rate in some situations. Fast adding will affect the percentage of conversion of methyl ester of vegetable oil to emulsifier as it forms suspension immediately, which will hinder the caustic soda reaction with methyl ester.

At 306, the mixture is thermally treated. In some implementations, the mixture can be stirred (or otherwise agitated) for a certain duration at a temperature that is greater than room temperature for six hours. Stirring facilitates and increases contact between the caustic soda and methyl ester. Heating at the temperature creates Brownian motion of the reaction mixture and accelerates reaction kinetics.

At 308, the thermally treated mixture is maintained at a static condition. In some implementations, the agitation of the thermally treated mixture and the heating can be ceased to allow the mixture to cool to room temperature. No other action can then be performed on the mixture. Maintaining the mixture at the static condition can allow the methyl groups to be cleaved off, resulting in the emulsifier.

At 310, water is added to the reaction mixture to separate the oil and water phases, thereby isolating the emulsifier. The water volume can be 15-30% of the oil volume taken initially for the reaction.

At 312, the pH of the mixture is adjusted. In some implementations, the pH is adjusted by adding an acid to the reaction mixture until the pH of the mixture reaches a level at which an oil phase separates out from the reaction mixture.

At 314, the non-aqueous and aqueous phases are separated. In some implementations, the two phases are separated by first transferring the reaction mixture to a separation flask, from which the aqueous phase is removed. In some implementations, additional water can be added to the separation flask to wash and remove any remaining inorganic salts in the non-aqueous phase. The remaining non-aqueous phase along with emulsion is left in static condition to allow the emulsion to de-foam. The de-foamation may further release water, which can be removed as previously described. The non-aqueous phase from which the foam has been removed is available as the emulsifier.

Figure 4:
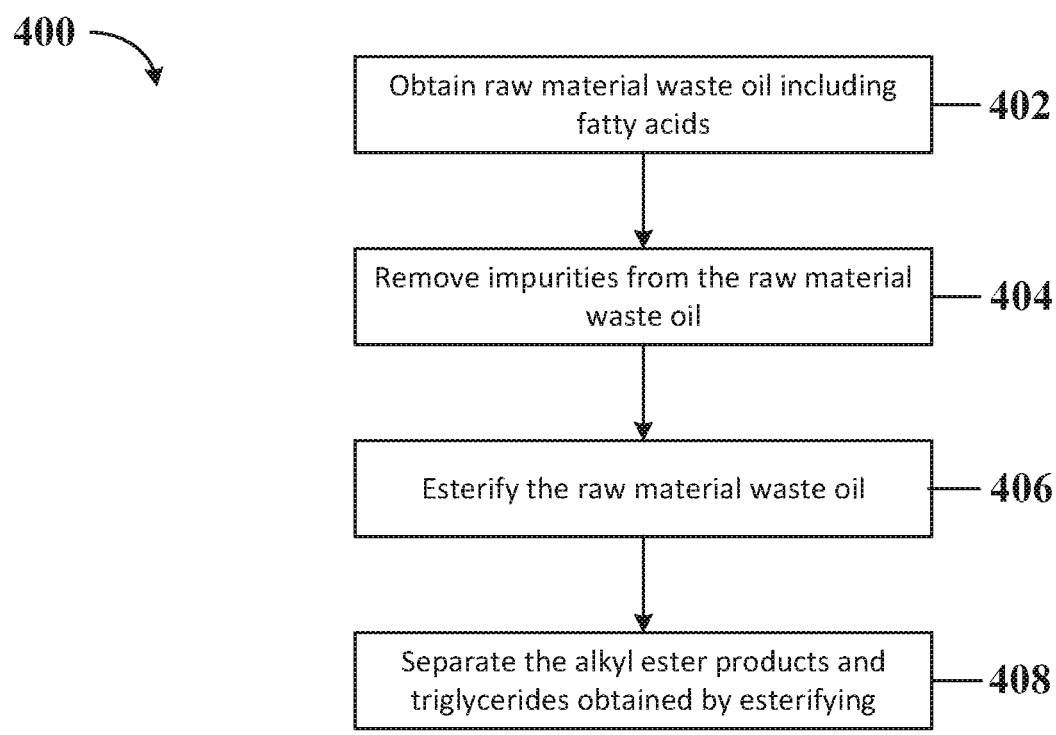
FIG. 4 is a flowchart of an example process of producing esterified waste vegetable oil.

FIG. 4 is a flowchart of an example process 400 of producing esterified waste vegetable oil. For example, the esterified waste vegetable oil produced by implementing process 400 can be used to produce the emulsifier by implementing the process 300. In some implementations, the additive can be used in wellbore fluids, for example, drilling fluids (specifically, oil-based drilling fluids), fracturing fluids, completion fluids, stimulation fluids, or a combinations of them.

At 402, the waste vegetable oil including fatty acids is obtained. In some implementations, the waste vegetable oil can be processed vegetable oil produced as a byproduct by the food industry.

Throughout this disclosure, the term "substantially" represents a permissible deviation of 5% from a disclosed quantity. The waste vegetable oil can have a plastic viscosity of greater than substantially 50 centipoise (cP) or 60.8 cP measured using a multi-speed rotational viscometer. The waste vegetable oil can have a plastic viscosity ratio of waste vegetable oil to mineral oil that is greater than substantially 10 (for example, substantially 11.18). The waste vegetable oil can have a plastic viscosity ratio of more than substantially 20 with respect to the plastic viscosity of a very refined oil produced by Safra (Jeddah, Saudi Arabia) and used for offshore drilling. Safra is a refined mineral oil. The waste vegetable oil can have a plastic viscosity ratio of substantially 24.12 with respect to the very refined oil produced by Safra and used for offshore drilling. The waste vegetable oil can have a plastic viscosity ratio of more than substantially 10 with respect to the plastic viscosity of mineral oils that are used for oil-based drilling fluid formulations. These oils have very similar viscosity value of around 10 cP although the plastic viscosity of mineral oil is more than that of refined mineral oil as expected. Mineral oil can be bought as mineral oil in the market. Refined mineral oil is called Safra oil that is used in offshore drilling as well.

The waste vegetable oil can include fatty acids with a short chain alcohol. The short chain alcohol can include at least one or more of methanol, ethanol, propanol, butanol, or combinations of them. The fatty acids can include molecules averaging substantially from 16 carbon atoms to less than 20 carbon atoms.

At 404, impurities are removed from the waste vegetable oil. The impurities, for example, food residues, can reduce the functional capability of the waste vegetable oil. In some implementations, the waste vegetable oil can be filtered, for example, quick filtered, at low pressure, for example, a pressure range of substantially 5 pounds per square inch (PSI) to substantially 10 PSI. Impurities can be removed from the waste vegetable oil using alternative or additional methods.

At 406, the raw material waste oil is esterified. In some implementations, the raw material waste oil is esterified in the presence of a catalyst to produce alkyl ester products and triglycerides. The catalyst can include at least one of sodium hydroxide, potassium hydroxide, sodium alkoxide, potassium alkoxide, or combinations of them. For example, the waste vegetable oil can be esterified with methanol in the presence of sodium hydroxide. At 408, the alkyl ester products and triglycerides are separated. Example techniques for implementing portions of process 400 to produce the esterified waste vegetable oil are described below. Alternative techniques can be implemented to produce the esterified waste vegetable oil.

Removal of Impurities and Excess Water

A low pressure filtration cell can be used to remove impurities, for example, burnt and unburned food residue, present in the waste vegetable oil. The low pressure filtration cell can include filter paper that has pore sizes that were less than 5 microns (μm) to remove impurities that were larger than 5 μm. A constant pressure of 5-10 PSI can be used on the low pressure cell for quick filtration of a volume of the waste vegetable oil. Other filtration media, adsorbents, or both, that are capable of removing all impurities and excess water from the waste vegetable oil can be used as alternatives or in addition to the low pressure filtration cell. For example, a multi-cell filtration apparatus can be used for removing the impurities.

Determination of Quantity of Catalyst

A quantity of catalyst required to process the waste vegetable oil can be determined by titration method. To do so, for example, 1 milliliter (mL) of waste vegetable oil can be mixed with 10 mL of isopropyl alcohol of 99.2% purity by volume. To this mixture, 2-3 drops of an indicator fluid (for example, phenolphthalein) can be added. The indicator fluid can be added drop-by-drop into the agitated waste vegetable oil until the color changes to pink. After the endpoint, the mixture can be stirred for a while to check the permanency of the pink color. The titration test can be repeated three times to calculate the average amount of catalyst required to reach the endpoint. After determining the average value of sodium hydroxide (NaOH) based on the titration test results, a constant value (for example, 3.5 grams (g)) can be added to determine the total amount of catalyst (for example, between 4.18 g and 4.22 g) required for 1 liter (L) of waste vegetable oil.

Esterification to Remove Triglycerides

The viscosity of the waste vegetable oil can be reduced to match the mineral oil viscosity (around 12 cP) by esterifying the base oil using methanol. To do so, a volume of methanol, for example, 20% of the original waste vegetable oil volume, and the mass of NaOH (for example, 4.22 g NaOH/liter of waste vegetable oil) can be mixed in a very dry condition (no detectable amounts of water) using a magnetic stirrer and then added to the waste vegetable oil in a container. The mixture can then be stirred for six hours using the magnetic stirrer to complete the interactions.

Sedimentation

The total reaction product can be allowed to stay in static conditions overnight to complete the sedimentation of glycerol and sludge at the bottom of the container. During the initial settling phase, the emulsion formed, can be broken by heating the processed mass at about 80° C. In some implementations, the emulsion is formed due to the presence of some emulsion forming byproducts in the ester layer. In some instances, adding about 10 mL of acetic acid per liter of waste vegetable oil can break and prevent the emulsion formation.

Separation and Washing of Esterified Oil

After complete sedimentation, the top clear esterified oil was decanted slowly and washed for several hours using water while stirring with a magnetic stirrer. Then, the esterified oil and the washed water were kept in static condition overnight for effective separation of oil and water phases. The separated oil phase was decanted slowly to remove it from the water phase. The process of washing was repeated, for example, twice.

Example

The process 300 to produce the emulsifier was implemented as described here. Substantially 300 milliliters (mL) of methyl ester of waste vegetable oil was taken in a beaker having a magnetic stirring bar and placed on a hot plate stirrer. The methyl ester was stirred at substantially 500 rotations per minute (rpm). A caustic soda solution was prepared by dissolving substantially 15 grams (g) of sodium hydroxide in 50 mL of water. The caustic soda solution was added to the methyl ester over a period of substantially two minutes, which turned the reaction mixture into a suspension. The reaction mixture was stirred for substantially 6 hours at substantially 60° C., and then allowed to be static for substantially 16 hours, which resulted in the reaction mixture becoming thick and of semi-solid consistency. Substantially 50 mL of water was added to the mixture. Hydrochloric acid (substantially 31% by volume) was added drop-by-drop to the reaction mixture until the pH of the reaction mixture was around 4-5, upon which an oil phase separated out from the reaction mixture. The reaction mixture was transferred to a separation flask. The aqueous phase, which was separated from the non-aqueous phase by an emulsion layer, was slowly and carefully removed from the separation flask. Substantially 50 mL of water was added to the remaining non-aqueous phase in the separation flask for washing and removing of any inorganic salts that remained in the non-aqueous phase. The aqueous phase formed again was removed slowly and carefully from the separation flask, and the step was repeated. The remaining non-aqueous phase along with the emulsion was left in static condition to allow de-foamation of the emulsion. Water released upon de-foamation was removed from time to time. Finally, the non-aqueous phase was collected as a colorless liquid.

Thus, particular implementations of the subject matter have been described. Other implementations are within the scope of the following claims.

What is claimed is:

1. A method of producing a wellbore treatment chemical, the method comprising cleaving an ester group of a methyl ester of waste vegetable oil to produce an emulsifier of the waste vegetable oil, wherein cleaving the ester group comprises:
    adding a caustic soda solution to the methyl ester resulting in a mixture;
    thermally treating the mixture at substantially 60° C.;
    adjusting a pH of the mixture by adding an acid;
    forming of an aqueous phase and a non-aqueous phase in response to adding the acid;
    separating the aqueous phase from the non-aqueous phase.

2. The method of claim 1, wherein adding the caustic soda comprises adding caustic soda at a rate of one milliliter per minute.

3. The method of claim 1, wherein separating the aqueous phase from the non-aqueous phase comprises statically maintaining the mixture.

4. The method of claim 1, further comprising adding water to the methyl ester to isolate the emulsifier.

5. The method of claim 1, wherein separating the aqueous phase from the non-aqueous phase comprises transferring the aqueous phase and the non-aqueous phase to a separation flask.

6. The method of claim 1, further comprising filtering the vegetable oil prior to cleaving the ester group.

7. The method of claim 1, further comprising determining a quantity of caustic soda to be used via titration.

8. The method of claim 1, wherein the caustic soda solution comprises sodium hydroxide.

9. The method of claim 8, wherein the solution comprises water.

10. The method of claim 1, further comprising stirring the mixture during thermally treating the mixture.

11. The method of claim 1, wherein adjusting the pH of the mixture comprises adding an acid.

12. The method of claim 11, wherein the acid is substantially 31% hydrochloric acid.

13. The method of claim 1, wherein the adjusted pH of the mixture is substantially between 4 and 5.

14. A method of cleaving an ester group of a methyl ester of waste vegetable oil to produce an emulsifier of the waste vegetable oil, the method comprising:
    adding a caustic soda solution to the methyl ester resulting in a mixture;
    thermally treating the mixture;
    adjusting a pH of the mixture resulting in formation of an aqueous phase and a non-aqueous phase; and
    separating the aqueous phase from the non-aqueous phase.

15. The method of claim 14, further comprising, pumping either the non-aqueous phase or the aqueous phase into a wellbore.

16. The method of claim 14, wherein the mixture is heated to a temperature greater than room temperature.

17. The method of claim 16, wherein the temperature is substantially 60° C.

18. A method of producing an emulsifier comprising:
    receiving waste vegetable oil;
    cleaving an ester group of a methyl ester of the waste vegetable oil to produce an emulsifier of a waste vegetable oil, wherein cleaving the ester group comprises:
        adding a caustic soda solution to the methyl ester resulting in a mixture;
        thermally treating the mixture;
        adjusting a pH of the mixture by adding an acid;
        forming of an aqueous phase and a non-aqueous phase in response to adding the acid;
        separating the aqueous phase from the non-aqueous phase.

19. The method of claim 1, further comprising pumping either the non-aqueous phase or the aqueous phase into a wellbore.

* * * * *